Aug. 2, 1966 R. G. FARAGHER 3,263,399
HALTER-BRIDLE COMBINATION
Filed Nov. 23 1964 2 Sheets-Sheet 2
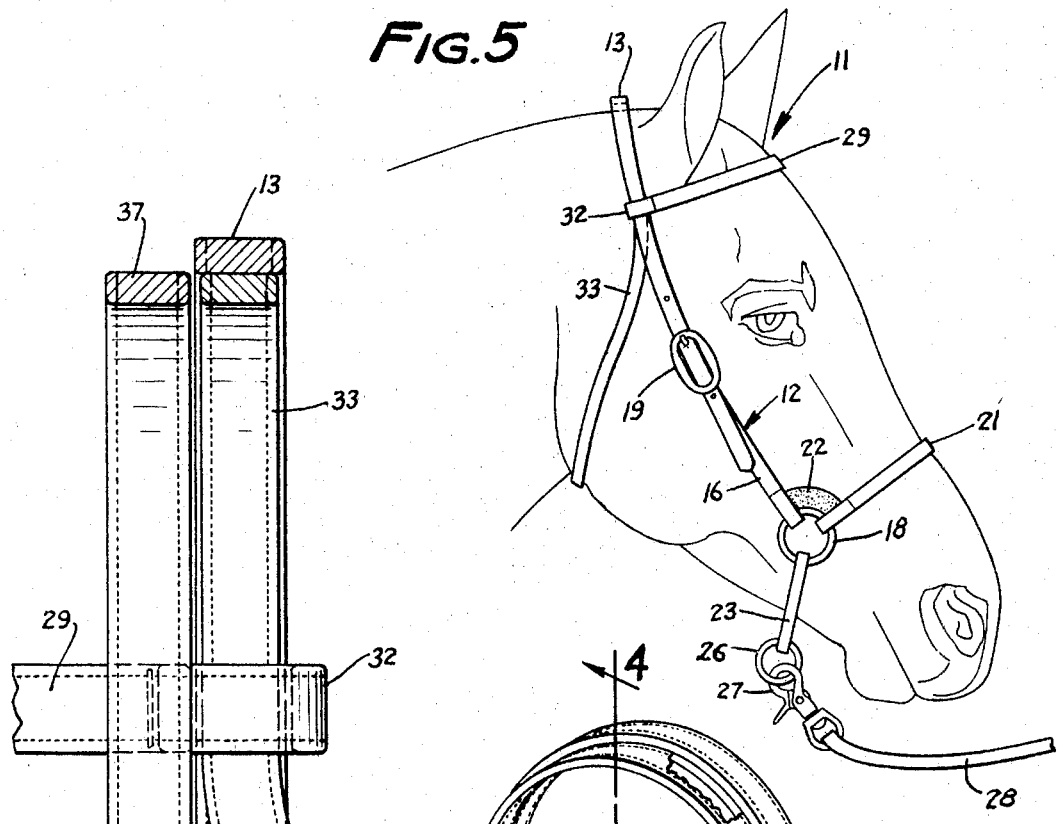
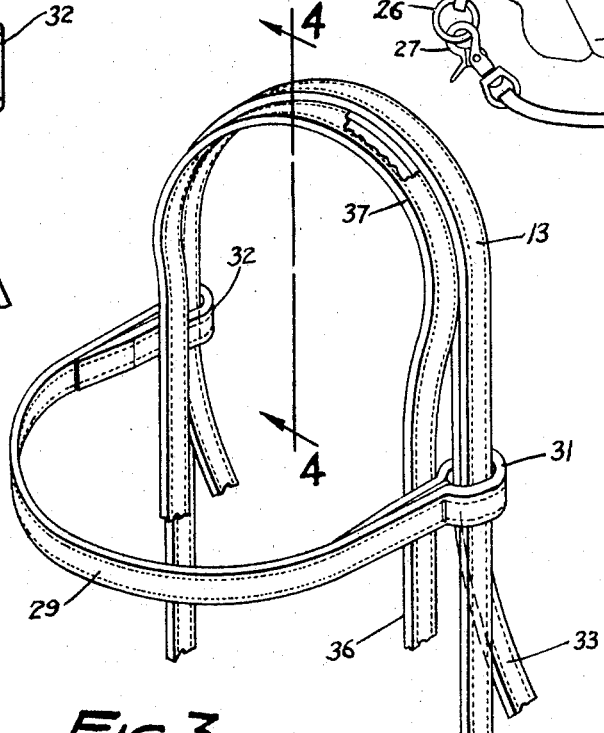
INVENTOR.
REGINALD G. FARAGHER
BY
Moore, White & Burd
ATTORNEYS United States Patent Office 3,263,399
Patented August 2, 1966

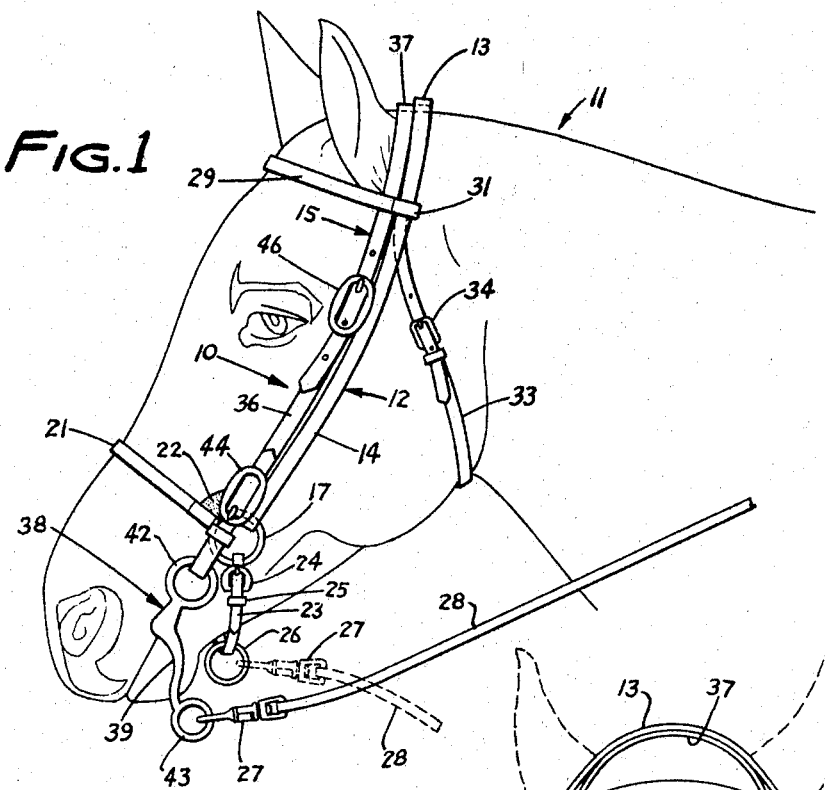
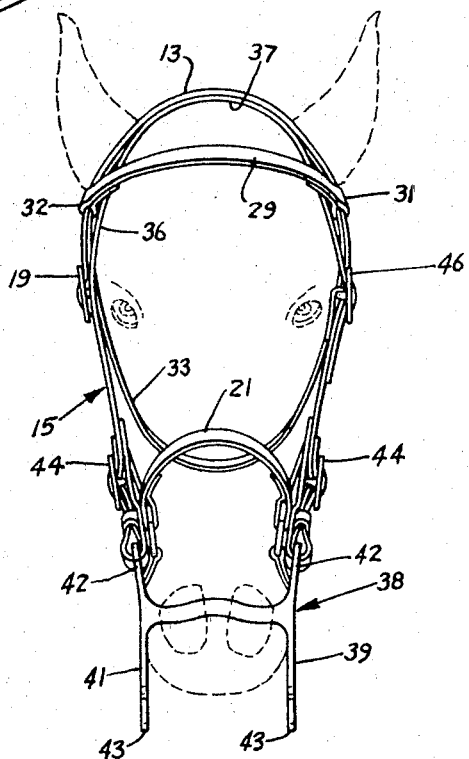

3,263,399
HALTER-BRIDLE COMBINATION
Reginald G. Faragher, 615 2nd Ave. S.,
Minneapolis 2, Minn.
Filed Nov. 23, 1964, Ser. No. 412,935
3 Claims. (Cl. 54—6)

This invention relates to a restraining apparatus for an animal and more particularly to a halter-bridle for a riding horse.

Numerous halters and bridles for horses have been designed to restrain and control the horses by controlling the movement of their heads. Normally the bridle and halter are separate harness items which are individually used to guide the horse and to secure him to a fixed object. On long trail rides the pleasure riding horse must be periodically halted and temporarily tied while the equestrian enjoys rest and refreshments. If a halter is not available the reins attached to the bridle are tied to a fixed object as a hitching post or tree without removing the bit from the horse's mouth. This practice is objectionable because movement of the bit can injure the horse's mouth and permits the horse to dislocate the bit in his mouth and even remove the bit and bridle from his head by slippage or breaking loose.

Prior to this invention when a pleasure riding horse was taken on a long trail ride the rider would carry a halter for his horse. On rest stops the bridle would be removed and replaced by the halter. To avoid the problem of having a free horse the bridle is sometimes placed on the horse's head over the halter. This is an unattractive harness arrangement and is functionally undesirable as the halter interferes with the position and action of the bit in the horse's mouth.

It is the object of this invention to overcome the disadvantages of the combined use of a halter and bridle by providing an improved halter-bridle for pleasure riding horses usable as a halter or bridle at the option of the rider.

Another object of the invention is to provide a halter-bridle for a horse having a head stall carrying a bit and a riding halter for maintaining the position of the head stall on the horse's head.

A further object of the invention is to provide a halter-bridle including a riding halter and a head stall carrying a bit which is removable from a horse's head without the necessity of removing the riding halter.

Yet another object of the invention is to provide a bridle unit having a head stall and a bit for a halter-bridle which is removable from a horse's head without altering the adjusted position of the bit carried by the head stall.

An additional object of the invention is to provide a halter-bridle having a minimum number of separate straps and buckles which is durable in construction and imparts an attractive appearance having compactness and simplicity in style.

Other objects of the invention will become apparent as the description proceeds.

To the accomplishment of the foregoing and related ends, this invention comprises the features hereinafter fully described and particularly pointed out in the claims. The following description sets forth in detail a particular illustrative embodiment of the invention, this being indicative, however, of but one of the various ways in which the principles of the invention may be employed.

The invention is illustrated by the accompanying drawings in which the same numerals refer to corresponding parts and in which:

FIGURE 1 is a side view of the head of a horse restrained with the halter-bridle of this invention;

FIGURE 2 is a front view of the halter-bridle of FIGURE 1 positioned on the head of a horse shown in light broken lines;

FIGURE 3 is a fragmentary perspective view of the halter-bridle showing the crown strap, throat latch and brow band cooperating to position the head stall on the horse's head;

FIGURE 4 is an enlarged sectional view taken along the line 4—4 of FIGURE 3 looking in the direction of the arrows; and FIGURE 5 is a side view of the head of a horse restrained with the riding halter of the halter-bridle of this invention.

Referring to the drawing there is shown in FIGURE 1 the halter-bridle of this invention indicated generally at 10 positioned on the head 11 of a horse. The halter-bridle 10 is made from harness leather and has metal hardware, i.e., bit, buckles, rings and snaps. As illustrated in FIGURES 3 and 4, the leather straps are double lined and double stitched. Single leather or other flexible material may be used in the manufacture of the halter-bridle 10. As shown in FIGURES 1 and 5, the halter-bridle 10 has a riding halter 12 and a bridle unit 15 which are corelated when positioned on the horse's head so that they may be alternatively used as a bridle to guide the horse or as a halter to secure the hose to a fixed object.

The riding halter 12 comprises an inverted U-shaped crown strap 13 positioned rearwardly of the horse's ears and extended over the top of his head. Cheek straps 14 and 16 joined with the ends of the crown strap 13 are located on the opposite sides of the horse's head. The lower ends of the cheek straps 14 and 16 are looped through rings 17 and 18 respectively. As shown in FIGURE 5, cheek strap 16 has a buckle 19 used to adjust the length of the riding halter.

An arcuate nose band 21 extends over the nose of the horse and is looped at its opposite ends through the rings 17 and 18. Arcuate shaped leather members 22 are stitched into the loops of the adjacent cheek straps and nose band ends. The arcuate shaped members 22 position the nose band 21 in a plane which is substantially perpendicular to the plane of the cheek straps 14 and 16. A chin strap 23 looped through the rings 17 and 18 is positioned under the horse's lower jaw. The nose band 21 and chin strap 23 form a nose loop positioned about the lower section of the horse's head. The opposite end sections of the chin strap 23 are secured together with a buckle 24 used to adjust the length of the chin strap 23. By changing the position of one end of the chin strap with respect to the buckle 24 the size of the nose loop formed by the nose band and chin strap may be changed to accommodate different horses. Keepers 25 maintain the upper and lower straps of the chin strap 23 in alignment and in back-to-back relative relationship. The chin strap 23 carries a strong ring 26 for receiving a rope or the like used to attach the riding halter to a fixed object, such as a hitching post or tree. As shown in FIGURE 5, snap hooks 27 on the reins 28 may be attached to the ring 26 during a temporary tie-up of the horse.

A curved brow band 29 extended about the face of the horse is connected at its opposite ends to the crown strap 13. As shown in FIGURE 3, loops 31 and 32 provided at the opposite ends of the brow band 29 receive the crown strap 13 and throat latch 33. The loops 31 and 32 are wrapped tightly around the crown strap 13 and throat latch 33 so as to maintain the throat latch under and in alignment with the bottom side of the crown strap 13. As shown in FIGURES 1 and 2, the throat latch 33 extends over the top of the horse's head and downwardly under the horse's throat and has a buckle 34 forming an endless loop. The throat latch being located under the crown strap 13 holds the crown strap in an elevated position on the top of the horse's head. The riding halter 12 is held in position on the horse's head by the throat latch 33. As shown in FIGURES 1 and 5, when the throat latch 33 is connected in a loop and positioned under the horse's neck the brow band 29 is held in engagement with the horse's face. This fixes the location of the elevated crown strap 13 on the horse's head rearwardly of his ears.

The bridle unit 15 comprises an inverted U-shaped head stall 36 having a crown section 37 and carrying a bit 38. The head stall 36 is positioned on the horse's head with the bit 38 projected transversely of the horse's mouth. The crown section 37 of the head stall extends over the horse's head rearwardly of his ears and cooperates with the elevated crown strap 13 and brow band 29 of the riding halter 12 for maintaining the desired position of the head stall 36 on the horse's head. As shown in FIGURES 3 and 4, the crown section 37 abuts against the forward sides of the throat latch 33 and crown strap 13. The side sections of the head stall 36 lie under the end portions of the brow band 29. It is this relationship between the crown section 37 and the crown strap 13 which fixes and maintains the position of the bridle unit 15 on the horse's head.

The bit 38 is a curb bit having side members 39 and 41. Each side member has an upper ring 42 and a lower ring 43. The lower ends of the head stall 36 are looped through the upper rings 42 and are secured by buckles 44. This releasably attaches the bit 38 to the head stall 36. The curb bit 38 is shown as an illustration of one type of bit which may be employed to restrain the horse. It is contemplated that other bits such as the bar bit and snaffle bit may be used in lieu of the curb bit. The bits are changed by releasing the buckles 44 and attaching the desired bit.

The head stall 36 comprises two straps which are adjustably fastened together with a buckle 46 as shown in FIGURE 1. By adjusting the length of one strap of the head stall 36 with the buckle 46 the transverse position of the bit 38 in the horse's mouth may be varied. Once the optimum position of the bit in a particular horse's mouth is determined it need not be changed nor the adjustment lost in the removal of the halter-bridle 10 or bridle unit 15 from the horse's head.

As shown in FIGURES 1, 2 and 3, the crown section 37 of the head stall 36 is positioned adjacent the forward side of the crown strap 13 when the bit 38 is properly positioned in the horse's mouth. The crown section 13 lies over the upper portion of the throat latch 33, and is thereby elevated or raised forming a positioning stop for the head stall preventing the rearward movement of the head stall on the horse's head. From the crown section 37 the head stall extends under the brow band 29 adjacent the loops 31 and 32 and down along the cheek straps 14 and 16. This particular arrangement of the cheek straps of the riding halter and the side sections of the head stall follows the lines of the horse's head and presents an attractive appearance which has neatness and simplicity and style.

In use, the riding halter 12 and bridle unit 15 are positioned on the horse's head as shown in FIGURE 1. The throat latch 33 extends about the horse's neck and fixes the position of the crown strap 13 on top of the horse's head. The nose band extends over the horse's nose while the chin strap 23 is positioned under the chin. The chin strap 23 may be adjusted by repositioning buckle 24 to alter the circumference of the nose loop according to the horse and his temperament. The head stall 36 holds the bit 38 in proper position in the horse's mouth. This position of the bit is maintained by keeping the head stall on the horse's head adjacent the crown strap 13. This is accomplished by the elevated crown strap 13 and positioning the head stall 36 under the brow band 29.

During the riding of the horse the reins 28 are attached to the lower ring 43 of the bit 38 by snap hooks 27. During restraining and curbing of the horse caused by pulling forces on the bit 38 the riding halter 12 does not interfere with the action of the bit. The bit 38 is slidably supported in the looped ends of the head stall 36 and does not engage the nose band 21 of the riding halter 12. On the application of pulling forces to one or both reins 28 the bit will direct the horse according to the desires of the rider.

On long trail rides the horse is periodically tied to permit the rider to rest and have refreshments. When this is done the snap hooks 27 are removed from the bit rings 43 and attached to the halter ring 26 as shown in broken lines in FIGURE 1. When this is done the reins 28 may be secured to a fixed object whereby the horse is only restrained by the riding halter 12. Thus, the horse is free to move his head without dislodging or dislocating the bit from his mouth.

For prolonged periods of rest it is desirable to remove the bit 38 from the horse's mouth. This is readily accomplished by sliding the crown section 37 of the head stall 36 over the horse's ears and under the brow band 29. When this is done the bit 38 may be removed from the horse's mouth as it is carried on the ends of the head stall. The riding halter 12 remains on the horse's head. Since the riding halter is first secured to a fixed object the horse is prevented from escaping during the removal of the bit 38 from his mouth.

The removal of the head stall 36 from the horse does not change the selected adjusted position of the bit 38. In other words, the buckle 46 is not uncoupled. The length of the head stall 36 remains the same.

To place the bridle unit 15 on the horse's head the bit 38 is inserted into the horse's mouth and the head stall 36 is moved under the brow band 29. The crown section 37 is then moved past the horse's ears and positioned adjacent the forward side of the crown strap 13. The snap hooks 27 on the end of the reins 28 are then reattached to the lower bit rings 43. This places the horse in condition for riding.

In summary, the halter-bridle 10 has a riding halter 12 and a bridle unit 15 which cooperates with the halter when positioned on the horse's head. The bridle unit 15 includes a bit carried by a head stall 36. The riding halter 12 has a raised crown strap 13 forming a position stop for the crown section of the head stall. This accurately positions the head stall 36 on the horse's head and in turn maintains a selected transverse position for the bit 38 in the horse's mouth.

The head stall 36 carrying the bit 38 may be removed from the horse's head without removing the riding halter 12. This is acomplished by sliding the head stall 36 over the horse's ears and under the brow band 29. After the bit 38 is taken from the horse's mouth the riding halter 12 independently restrains the horse.

It is apparent that many modifications and variations of this invention as hereinbefore set forth may be made without departing from the spirit and scope thereof. The specific embodiments described are given by way of example only and the invention is limited only by the terms of the appended claims.

I claim:
1. A halter-bridle for a horse comprising
   (a) riding halter means positionable on the head of a horse, said halter means including
      (1) an inverted U-shaped strap means having a curved crown strap positionable over the head for placement on the crown thereof and cheek straps extendable along the sides of the head,
      (2) ring means connected to the lower portions of the cheek straps,
      (3) a nose strap having opposite ends connected to the ring means and the cheek straps, said nose strap positionable across the horse's nose,
      (4) a chin strap looped through the ring means and positionable under the horse's chin, said nose strap and chin strap forming a nose loop,
(5) a throat latch loop adapted to be placed about the horse's neck, said throat latch loop having a top portion positioned under and supporting the curved crown strap, to raise the crown strap from the horse's head,
(6) a brow band positionable across the horse's face, said brow band having loops at opposite ends thereof slidably surrounding the crown strap and throat latch loop for holding the top portion of the throat latch loop under the curved crown strap and allowing adjustment of the brow band relative to the strap means and throat latch loop, (b) head stall means having a crown section and side sections, said crown section positionable over the horse's head adjacent and in contact with the forward edge of the top of the throat latch and raised crown strap whereby said top of the throat latch and crown strap forms a positioning stop for the head stall means, said side sections positioned under opposite end sections of the brow band whereby the brow band holds the crown section of the head stall on the horse's head adjacent the top portion of the throat latch, and (c) bit means connected to the side sections of the head stall means, said bit means being held in position in the horse's mouth by the head stall means.

2. A halter-bridle for a horse comprising
(a) halter means positionable on the head of a horse, said halter means including
 (1) nose loop means positionable around the nose of the horse and adapted for attachment to a fixed object,
 (2) strap means having a crown strap adapted to extend over the top of the head of the horse, and lower ends connectable with the nose loop means,
 (3) throat latch means adapted to extend under the neck of the horse and over the top of the head of the horse, said throat latch means having a top portion positioned under and supporting the crown strap of the strap means and
 (4) a brow band positionable across the face of the horse, said brow band having loops at the opposite ends thereof slidably receiving the strap means and throat latch means for holding the top portion of the throat latch means in alignment with and under the crown section of the strap means and allowing adjustment of the brow band relative to the strap means and throat latch means,
(b) a bit positionable in the mouth of the horse, and
(c) head stall means having a crown section positionable over the horse's head adjacent and abutting the edge of the crown strap and throat latch and under opposite end sections of the brow band and opposite end sections attached to the bit to hold the position of the bit in the horse's mouth, 3. The halter-bridle defined in claim 2 wherein said nose loop means includes a nose band extendable over the nose of the horse, members secured to the nose bands and strap means to position the nose band in a plane substantially perpendicular to the plane of the strap means and a chin strap located under the horse's lower jaw.

References Cited by the Examiner

UNITED STATES PATENTS

| | | | |
|---|---|---|---|
| 249,412 | 11/1881 | Smith | 54—24 |
| 290,826 | 12/1883 | White et al. | 54—6 |
| 444,993 | 1/1891 | Shippy | 54—24 |
| 734,004 | 7/1903 | Stiegler | 54—6 |
| 1,582,635 | 4/1926 | Carey | 54—6 |

FOREIGN PATENTS 22,305   4/1907   Sweden.

OTHER REFERENCES

J. Roemer: Cavalry, Van Nostrand, N.Y. 1863. Pages 507–509, copy in 54–6A, Group 410.

SAMUEL KOREN, *Primary Examiner.*

ALDRICH F. MEDBERY, *Examiner.*